March 8, 1927.

S. MUNSON

LUBRICATOR

Filed June 26, 1926   2 Sheets-Sheet 1

1,620,381

INVENTOR.
Sweney Munson,
BY
Geo. F. Kimmel
ATTORNEY.

March 8, 1927.
S. MUNSON
1,620,381
LUBRICATOR
Filed June 26, 1926  2 Sheets-Sheet 2
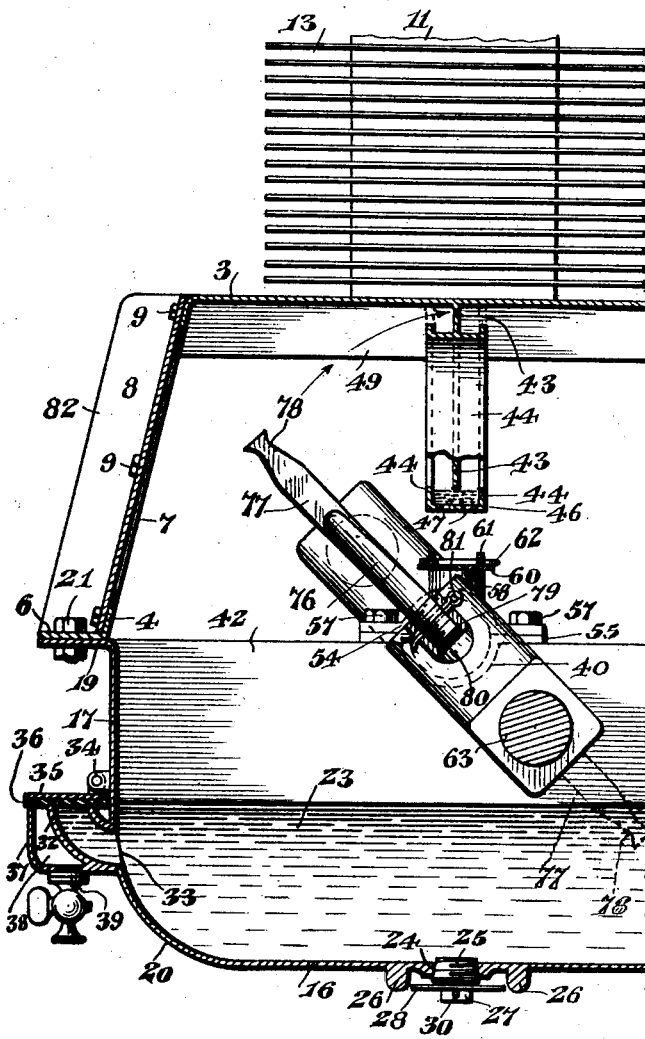
INVENTOR.
Sweney Munson,
BY
Geo. P. Kimmel. ATTORNEY.

Patented Mar. 8, 1927.

1,620,381

UNITED STATES PATENT OFFICE.

SWENEY MUNSON, OF SCAMMON, KANSAS.

LUBRICATOR.

Application filed June 26, 1926. Serial No. 118,802.

This invention relates to a lubricating system of the splash type, designed primarily for use in connection with internal combustion motors, but it is to be understood that a lubricating system, in accordance with this invention, can be employed in any connection for which it is found applicable, and the invention has for its object to provide, in a manner as hereinafter set forth, a splash system of lubrication for efficiently lubricating crank shaft and connecting rod bearings during the operation of the motor.

A further object of the invention is to provide, in a manner as hereinafter set forth, a splash system of lubrication including means operating through a body of lubricant for splashing the latter, during the operation of the motor, in an upward direction, trapping the lubricant as it is splashed, and then directing and supplying the trapped lubricant to the crank shaft and connecting rod bearings.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 2 is a section on line 2—2 Figure 1.

Figure 3 is a section on line 3—3 Figure 1 with the piston removed.

Figure 4 is a section on line 4—4 Figure 3.

Figure 5 is a section on line 5—5 Figure 3.

Figure 8 is a detail illustrating a closure plug retaining plate.

Figure 1:
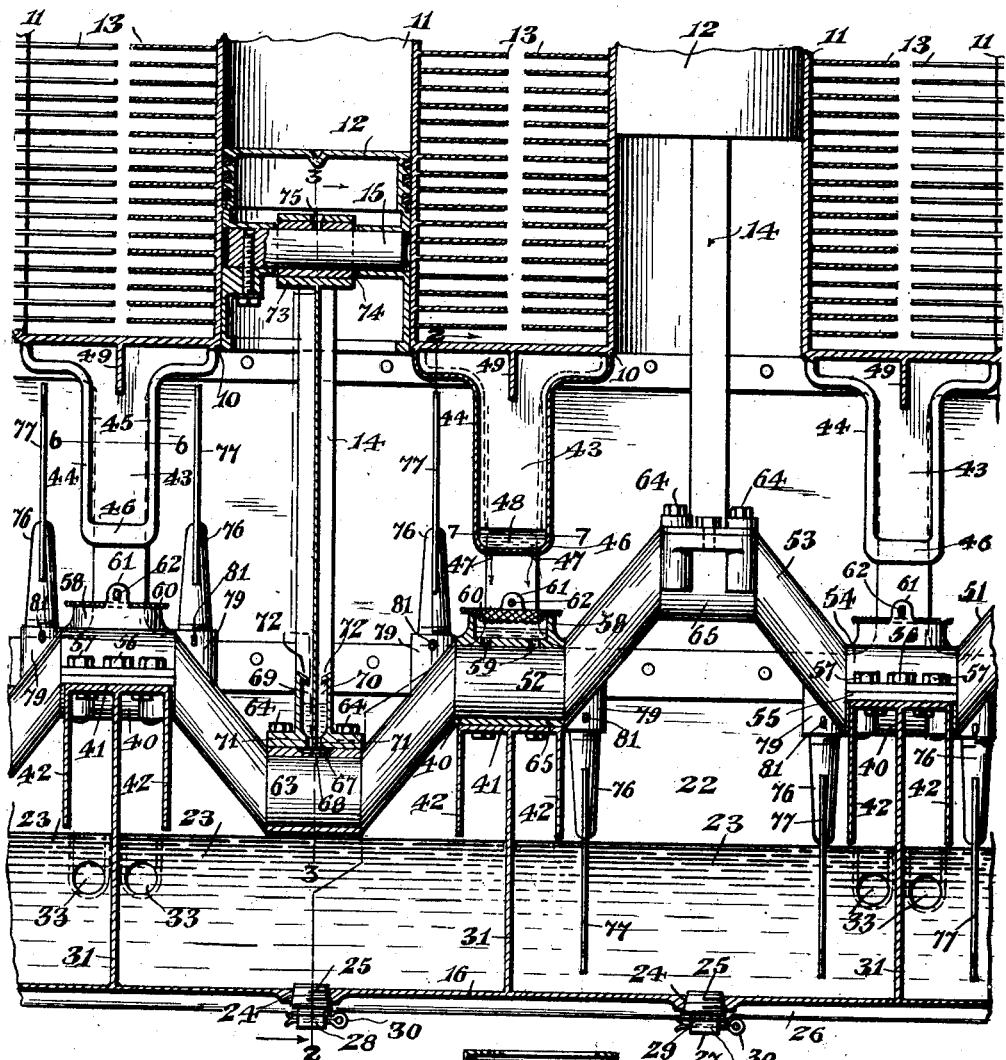
Figure 1 is a fragmentary view, in longitudinal section, of an internal combustion motor, showing the arrangement of the elements of a splash lubricating system, in accordance with this invention, with respect to the crank shaft and connecting rod bearings of the motor.
Figures 6, 7:
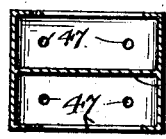
Figure 6 is a section on line 6—6 Figure 1.
Figure 7 is a section on line 7—7 Figure 1.

Referring to the drawings in detail the crank case of the motor is formed of an upper and a lower superposed section referred to generally by the reference characters 1 and 2 respectively. The section 1 is open at its bottom and the section 2 at its top. The section 1 comprises a top wall 3 and a pair of outwardly inclined side walls, 4, 5 which extend in opposite directions with respect to each other and each of which is formed at its lower end with a right angularly disposed lateral flange 6. Each of said side walls is formed with enlarged spaced openings 7 and each of the latter is closed by a removable plate 8 secured in position by hold fast devices 9. The openings 7 permit of inspection of the interior of the crank case. The top 3 is provided with spaced openings 10 with which register the lower ends of the cylinders 11 and operating in each of these latter is a piston 12. Each of the cylinders 11 is formed with peripheral fins 13. The connecting rods for each of the pistons 12 is generally referred to by the reference character 14. The connecting pin between each rod 14 and a piston 12 is indicated at 15.

The section 2 of the crank case comprises a bottom 16 and a pair of side walls 17, 18 and which have their lower portions rounded as at 20 and said rounded portions extend inwardly toward the bottom 16. The side wall 17, as well as the side wall 18 is formed with an outwardly extending right angularly disposed flange 19. The flanges 6 are seated upon the flanges 19 and are detachably connected therewith by the hold fast devices 21 whereby the section 1 is connected to the section 2 and arranged in superposed relation with respect thereto. The section 2 provides a lubricant chamber 22 and in which is arranged the body of lubricant 23. The bottom 16 of the section 2 is formed with a series of spaced openings 24 and each of which has a threaded wall. The openings 24 are of tapered contour and threadedly engaging with the wall of each opening 24 is a peripherally threaded closure plug 25. The openings 24 are for draining purposes. The bottom 16 has depending therefrom spaced pairs of lugs 26, each pair associating with a plug 25. Each plug 25 is formed with a polygonal shaped shank 27 having a cotter pin hole. The shank 27 is positioned between and spaced from a pair of lugs 26. Mounted on the shank 27 is a retaining plate 28 having an opening 29 which corresponds in contour to the shape of the shank 27. The plate 28 is arranged between the lugs of the pair 26 and coacts with these latter to prevent the turning of the plug 25. A cotter pin 30 extends through a cotter pin hole in shank 27 for maintaining the plate 28 on the shank 27. When it is desired to drain the lubricant chamber 22, the plates 29 are shifted from the shanks 27 and the plug then removed from the openings 24. The lubricant chamber 23 is divided into a series of compartments, by transversely extending partitions 31 and an opening 24 and plug 25 associate with each compartment. The partitions 31 are of the same height as the height of the section 2 and are formed integral therewith. The number of compartments for the lubricant corresponds to the number of cylinders of the motor. The oil chamber 22 is divided into compartments, so that when travelling up or down hill the lubricant cannot go to one end or the other and thus starve the other end of the motor from getting its proper amount of lubricant, as the case may be. The section 2 is provided with a filling tube for each compartment and such tube is indicated at 32, is of curved contour, integral with the outer side wall 17 of the section 2 and registers with an opening 33 formed in said side wall see Figure 2. Preferably the tubes 32 are arranged in pairs and a tube of a pair is positioned at each side of a partition 31, see Figure 1. Pivotally connected to the wall 17, as at 34, is a closure 35. The number of closures 35 corresponds with the number of pairs of filling tubes 32. A closure 35 is common to a pair of filling tubes 32 and each closure 35 carries a resilient sealing member 36 on its lower face see Figure 2. Formed integral with each pair of filling tubes 32, as well as spaced therefrom, is a collecting member 37 for collecting any overflow after the lubricant has been supplied or during the supplying of the lubricant to a compartment. The member 37 forms a chamber 38 provided at its bottom with a drawoff cock 39.

Each partition 31, centrally of its top, is formed with a semi-circular cutout portion 40 as indicated in dotted lines in Figure 2. Formed integral with the top edge of each portition 31, as well as being formed integral with the walls 17 and 18 of the section 2, is a plate 41 which projects laterally in both directions from the partition 31. Formed integral with each side of the plate 41, and depending therefrom, is a support 42 which is spaced from the partition 31, and has its ends formed integral with the walls 17 and 18 of the section 2 of the crank case. The plate 41 has its central portion conform in contour to the cutout portion 40 and the top of the support 42 corresponds in contour to the shape of the plate 41. In other words each partition 31, in connection with its associated plate 41 and support 42 are set up to provide a depending semi-circular cavity centrally of the top thereof and which is shown in dotted lines in Figure 2. The cavity is provided for the semi-circular portion of a bearing for a crank shaft to be presently referred to.

Formed integral with the top 3 of the section 1 of the crank case and arranged over, as well as being spaced a substantial distance above each plate 41, is a suspended lubricant trapping element and which provides means for directing the lubricant to an oil cup formed at the top of each bearing for the crank shaft. Each combined trapping and directing element for the lubricant, comprises a substantially T-shaped plate 43 which is integral with and depends from the top wall 3 of the section 1 of the crank case. The top of the plate 43 extends in a plane which intersects the axes of the cylinders 11. Formed integral throughout each side edge of the plate 43, as well as conforming in contour to the shape of the side edge, is an arm 44. The arms 44 have their inner faces integral with the plate 43 and project from each face of the latter. The arms 44 are also integral with the top wall 3 of the section 1 of the crank case. Each arm 44 at each side edge thereof is formed throughout with an inwardly extending flange 45 and each of the flanges of each arm overlap a face of the plate 43. Formed integral with the lower ends of the arms 44 and arranged below the lower end of the plate 43 is a rectangular casing 46 which provides a lubricant collector and has its bottom formed with a series of outlets 47 through which the lubricant 48 passes. The collector 46 receives the lubricant which is trapped and directed by the trapping element. The lower end of the plate 43 is positioned above, but disposed at the longitudinal center of the collector 46. Formed integral with one face of the plate 43, at the top tnereof, as well as integral with the wall 3 of the section 1 and also with the wall 4 of said section 1, is a reinforcing web 49 and extending from the other face of the plate 43 and integral with the walls 3 and 5 of the section 1 is a reinforcing web 50.

The constructing of each trapping element, in the manner as referred to, provides a pair of trapping and directing devices for the trapped lubricant, and with one of said devices arranged on one side of the element and the other of said devices on the other side of the element and when the engine travels in one direction one of said devices will trap and direct the lubricant to the collector 46 and when the engine operates in the other direction the other device will trap and direct the lubricant to the collector 46.

The crank shaft is referred to generally by the reference character 51 and as shown is set up with a series of journals 52 and a series of cranks 53. The number of cranks correspond with the number of pistons and two journals 52 associate with each crank 53. Each crank 53 operates through a lubricant compartment. Each trapping element is arranged above a journal 52. Each lubricant compartment is arranged below a cylinder 11. Each trapping element is positioned between a pair of cylinders 11. The cranks 53 are arranged in pairs in a manner whereby when one crank of a pair is up the other crank will be down or in other words the cranks of each pair operate in alternate directions, see Figure 1. Associated with each journal 52 is a bearing therefor consisting of an upper section 54 and a lower section 55. The sections 54 and 55 are of semi-circular contour and oppositely disposed with respect to each other and each section is formed with a pair of laterally extending flanges 56. The flanges of the upper section seat on the flanges of the lower section and are fixedly secured together by hold fast devices 57 and the said hold fast devices 57 further secure the sections of the bearings to the plate 41, see Figure 1. Each bearing for a journal 52 is stationary and the upper section 54 of each bearing is provided with an oil cup 58 having its bottom formed with ports 59 for supplying the oil or lubricant to the journal 52. Extending across the top of the oil or lubricant cup 58 is a filtering means 60. The lubricant is supplied to the cup 58 from the collector 46, see Figure 1. Each oil or lubricant cup is formed with a pair of opposed, spaced apertured lugs 61, through which extends a cotter pin 62, for retaining the filtering means 60 in position with respect to the cup. See Figure 2.

The journal on each crank 53 is indicated at 63 and said journal associates with a connecting rod 14. With reference to Figure 3 the journal 63 is mounted in a bearing to which is coupled by the hold fast devices 64 the lower end of the connecting rod 14. The bearing for the journal 63 comprises a lower section 65 and an upper section 66. The sections 65 and 66 oppose each other and have their opposed faces shaped to surround the journal 63. The section 66 extends into the section 65, and also overlaps the top of the latter. The hold fast devices 64 not only couple the connecting rod 14 to the bearing, but further secure the sections of the bearings together in overlapping position with respect to the journal 63. The top of the section 66, centrally thereof is provided with a lubricant well 67 and is also formed with an opening 68 for supplying the lubricant from the well 67 to the journal 63. The lubricant is fed to the well 67, from a pair of trapping compartments 69, 70, formed at the lower end of the connecting rod 14 and the latter has its lower end provided with openings 71 for establishing communication between the trapping compartment and the well 67. The top of each outer wall of a trapping compartment at the lower end of the connecting rod 14, is formed with an inwardly extending downwardly inclined deflector 72. The upper end of the connecting rod 14 is provided with a sleeve or collar 73 in which is mounted a bearing sleeve 74 for the pin 15. The collar 73, as well as the sleeve 74 is formed with registering openings 75 for the passage of lubricant to the pin 15. The connecting rod 14 tapers from its lower end to the collar or sleeve 73 and that portion of the connecting rod 14 between the deflector 72 and the collar 73 is in the form of an I-beam see Figure 5. The trapping compartments 69 and 70 formed at the lower end of the connecting rod 14 are clearly shown in the cross sectional view in Figure 4.

Associated with each crank 53 and operating in a lubricant compartment for splashing the lubricant for the purpose of lubricating the crank shaft and connecting rod bearings is a pair of lubricant splashers and each of which consists of a bifurcated, tapered holder 76, to which is secured a splasher finger 77 provided in each side edge, near its outer end with a concavity 78. The holder 76 at its inner end is peripherally threaded, as at 79 and threadedly engages with an interiorly threaded collar 80 which projects from an end of a crank 53 in proximity to a journal 52. The holder 76 is additionally secured to the collar 79 by a cotter pin 81. Each pair of splasher elements or devices is oppositely disposed with respect to an adjacent pair whereby the said pairs will travel in opposite directions with respect to each other during the operation of the crank shaft 51.

The lubricant splashers are so arranged, with respect to a piston, that when the latter is down, the splashers are at the top of their movement, and this will prevent the lubricant from being thrown into the cylinder and prevent the piston from pumping lubricant or oil.

The plates 8 are positioned between the webs 82 which project outwardly from the side walls 4 and 5 of the upper section 1 of the crank case.

On the operation of the crank shaft, the splashers will be carried therewith and the oil will be thrown in the direction of the arrows shown on Figure 2. The trapping elements will act to gather and direct the lubricant to the collectors 46 and from there the lubricant will be supplied to the cups 58. Under such conditions the journals 52 will be lubricated. On the operation of the splashers, the connecting rods 14 will also take up a quantity of the lubricant, and which will pass into the trapping or collecting chamber 69 and 70 and from there supplied for the purpose of lubricating the journal 63.

It is thought that the many advantages of a lubricating system, of the splash type in accordance with this invention, can be readily understood, and although the preferred embodiment of the invention is as illustrated and described, yet it is to be understood that changes in the details of construction can be had which will fall within the scope of the invention as claimed.

What I claim is:

1. In a lubricating system of the splash type for crank shaft and connecting rod bearings the combination with the crank of a crank shaft, and a pair of spaced interiorly threaded collars carried by said crank, a holder secured in each of said collars and projecting therefrom, and a splasher finger secured to each holder and extended therefrom.

2. In a lubricating system of the splash type for crank shaft and connecting rod bearings, a combined trapping directing and lubricant collecting element consisting of a T-shaped plate arranged above the crank shaft, a pair of arms secured to the edges of said plate centrally of the inner faces of the arms, each of said arms formed throughout and at each side with an inwardly extending flange overlapping one face of said plate, and a casing connecting the lower ends of said arms together and having outlets in the bottom thereof.

3. In a lubricating system of the splash type for crank shaft and connecting rod journals comprising in combination, a crank shaft provided with spaced journals arranged in pairs and a crank interposed between, integral with and operating between each pair of journals and including a crank pin or journal, a bearing for each shaft journal formed at its top with a lubricant receiving cup having an outlet leading to such journal, a pair of spaced lubricant splashers bodily carried by each crank shaft and each arranged in proximity to a shaft journal, a pair of lubricant trapping and directing devices arranged over each bearing and discharging the trapped lubricant into a cup, each cup arranged directly below and spaced from a pair of trapping and directing devices.

4. A lubricating system of the splash type in accordance with claim 4, a filtering element mounted upon the top of each cup, and means intermediate the ends of a cup for securing said filtering element in position.

In testimony whereof, I affix my signature hereto.

SWENEY MUNSON.